(12) United States Patent
Quertelet et al.

(10) Patent No.: US 8,157,235 B2
(45) Date of Patent: Apr. 17, 2012

(54) DEVICE FOR FIXING A WIRE CABLE RACEWAY TO A THREADED ROD

(75) Inventors: Stéphane Quertelet, Remy (FR); Ludovic Warin, Jaulzy (FR)

(73) Assignee: I.C.M. Group, Montbard (FR)

( * ) Notice: Subject to any disclaimer, the term of this patent is extended or adjusted under 35 U.S.C. 154(b) by 200 days.

(21) Appl. No.: 12/413,867

(22) Filed: Mar. 30, 2009

(65) Prior Publication Data

US 2009/0242710 A1 Oct. 1, 2009

(30) Foreign Application Priority Data

Mar. 31, 2008 (FR) ..................................... 08 01742
Jan. 12, 2009 (FR) ..................................... 09 00103

(51) Int. Cl.
*B42F 13/00* (2006.01)
(52) U.S. Cl. ........ 248/339; 248/327; 248/328; 248/317; 248/59; 248/60; 211/26
(58) Field of Classification Search .................. 248/327, 248/328, 59, 317, 60, 68.1, 61, 63, 65, 225.31, 248/304, 301, 339, 340, 58, 215, 56, 214, 248/225.21, 225.11; 52/484; 211/26; 403/397
See application file for complete search history.

(56) References Cited

U.S. PATENT DOCUMENTS

| | | | | | |
|---|---|---|---|---|---|
| 2,286,118 | A | * | 6/1942 | Sleeth | 248/58 |
| 2,968,850 | A | * | 1/1961 | Tinnerman | 403/397 |
| 3,233,297 | A | * | 2/1966 | Havener | 403/397 |
| 3,463,428 | A | * | 8/1969 | Kindorf et al. | 248/72 |
| 3,562,873 | A | * | 2/1971 | Cumber | 403/397 |
| 3,730,466 | A | * | 5/1973 | Swanquist | 248/216.4 |
| 3,837,609 | A | * | 9/1974 | Weiss et al. | 248/317 |
| 3,995,823 | A | | 12/1976 | Hensel | |
| 4,333,264 | A | * | 6/1982 | Smrt | 47/42 |
| 4,723,749 | A | * | 2/1988 | Carraro et al. | 248/317 |
| 5,271,585 | A | * | 12/1993 | Zetena, Jr. | 248/49 |
| 5,303,885 | A | * | 4/1994 | Wade | 248/59 |
| 5,482,240 | A | * | 1/1996 | Caraher | 248/297.51 |
| 5,899,041 | A | * | 5/1999 | Durin | 52/660 |
| 5,906,346 | A | * | 5/1999 | Lin et al. | 248/224.8 |
| 6,260,810 | B1 | * | 7/2001 | Choi | 248/65 |
| 6,438,921 | B1 | * | 8/2002 | Moore | 52/655.1 |
| 6,530,545 | B2 | * | 3/2003 | Deciry et al. | 248/49 |

(Continued)

FOREIGN PATENT DOCUMENTS

EP 1 376 808 1/2004

(Continued)

OTHER PUBLICATIONS

French Patent Office issued a Preliminary Search Report dated Nov. 20, 2008, Application No. FR-08.01742.

(Continued)

*Primary Examiner* — Nkeisha Smith
(74) *Attorney, Agent, or Firm* — Young & Thompson

(57) ABSTRACT

This device for fixing a wire cable raceway onto a threaded rod (4) includes:
- a body (6) with support members (12; 54; 12') featuring a first support surface and a second support surface opposite the first support surface,
- elements for fixing onto a threaded rod (4) including two elastic arms (8) each provided with a notch (20), the bottom of which is intended to cooperate with the thread of the threaded rod (4) in order to assure locking of the fixing device onto the threaded rod (4).

13 Claims, 3 Drawing Sheets

U.S. PATENT DOCUMENTS

| | | | |
|---|---|---|---|
| 6,590,154 B1 * | 7/2003 | Badey et al. | 174/480 |
| 6,619,627 B2 * | 9/2003 | Salisbury et al. | 256/1 |
| 6,643,900 B2 * | 11/2003 | Jahrling | 24/563 |
| 6,712,323 B1 * | 3/2004 | Cheung et al. | 248/201 |
| 7,117,650 B2 * | 10/2006 | Dockery | 52/506.07 |
| 7,178,789 B1 * | 2/2007 | Lehmann | 256/47 |
| 7,374,057 B2 * | 5/2008 | Hendrickson et al. | 220/3.8 |
| 7,468,491 B2 * | 12/2008 | Deciry et al. | 174/480 |
| 7,506,845 B2 * | 3/2009 | Oh | 248/73 |
| 7,523,897 B2 * | 4/2009 | Boltz et al. | 248/71 |
| 7,614,590 B2 * | 11/2009 | Boville | 248/72 |
| 7,661,632 B2 * | 2/2010 | Caveney et al. | 248/74.2 |
| 7,866,611 B2 * | 1/2011 | Hollender et al. | 248/67.7 |

FOREIGN PATENT DOCUMENTS

| | | |
|---|---|---|
| EP | 1 793 464 A1 | 6/2007 |
| JP | 02-113080 | 9/1990 |
| WO | 2007/075054 | 7/2007 |

OTHER PUBLICATIONS

French Search Report dated Jul. 3, 2009.

* cited by examiner

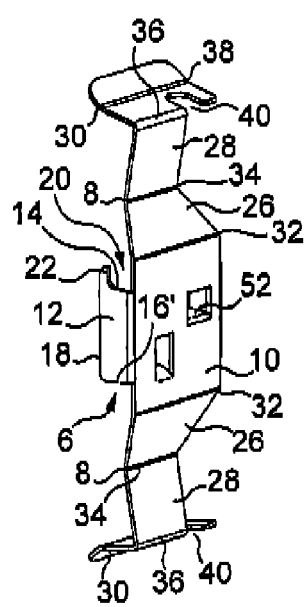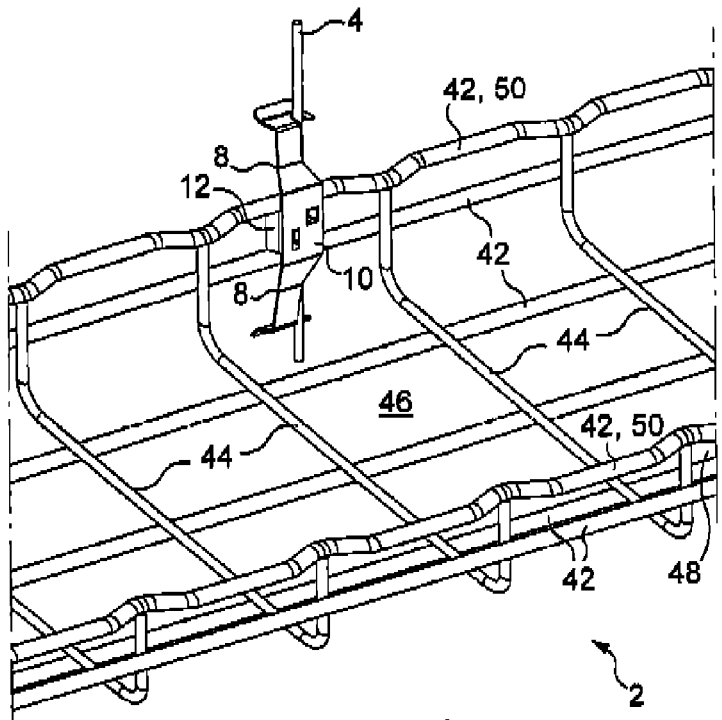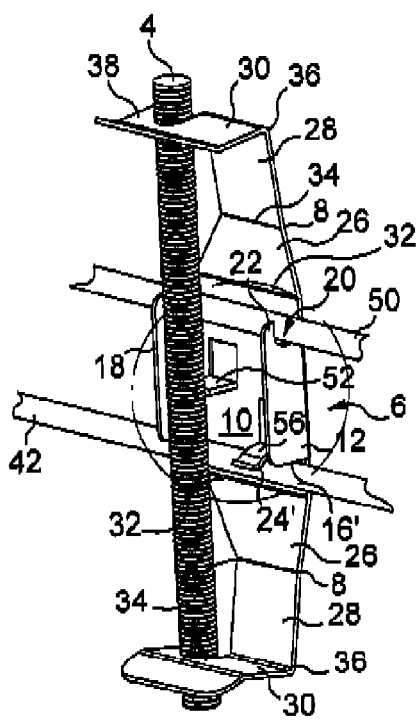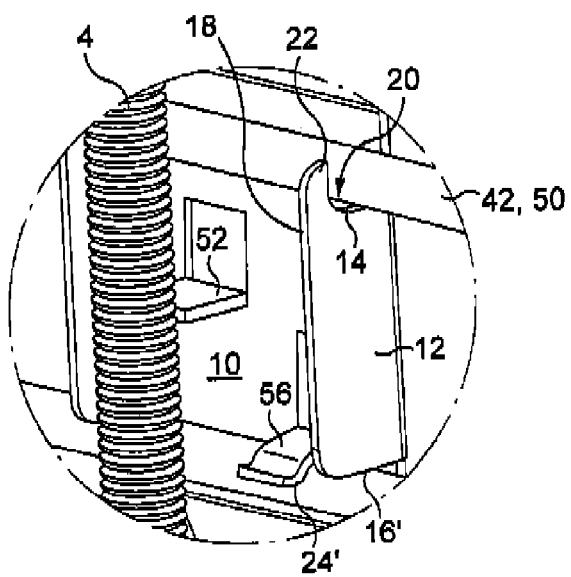
Fig. 7
Fig. 8
Fig. 9
Fig. 10

DEVICE FOR FIXING A WIRE CABLE RACEWAY TO A THREADED ROD

FIELD OF THE INVENTION

The present invention concerns a device for fixing a wire cable raceway to a threaded rod.

The field of the present invention is the installation of wire cable raceways. Cable raceways are used to support, house and protect elongate linear members such as electrical cables but also optical fibers or indeed tubes, for example pneumatic or hydraulic connecting tubes.

TECHNOLOGICAL BACKGROUND

A wire cable raceway generally has an elongate shape and a U-section. It includes longitudinal wires, also called warp wires, and transverse wires, also called weft wires. The warp wires are generally rectilinear and the weft wires have a U-shape. The weft wires are welded to the warp wires and are regularly spaced. The cable raceway produced in this way has a bottom intended to serve as a support for the cables, or the like, and lateral walls, or flanges, intended to retain the cables or the like on the bottom of the cable raceway.

Hereinafter, for simplicity and clarity, the description will be given with reference to electrical cables. However, the invention applies to any other type of elongate linear member that can be supported by a wire cable raceway.

Such a cable raceway is generally disposed along a wall. The cable raceways are most often installed high up, below a ceiling, with the assistance of a support. Two types of mounting are most commonly used to produce such a suspension.

In a first type of mounting, a hanger is fixed to the ceiling and receives one or more brackets serving as supports for the cable raceways to be suspended. The hanger is a shaped metal part that generally features a head plate for fixing it to the ceiling by means of screws. This type of mounting is used for cable raceways intended to receive a high load or also when a number of cable raceways are to be provided on the same support.

In another type of mounting, a cable raceway is simply suspended from the ceiling with the aid of threaded rods. This type of mounting is of interest because it is easy and quick to use and has an advantageous cost.

Mounting with the aid of threaded rods is effected mainly in two ways. In a first case, the mounting is of the so-called swing tray type. There is then at the level of a section of the cable raceway a threaded rod on either side of that cable raceway. A support is then mounted on the two threaded rods with the aid of nuts and the cable raceway comes to rest on that support. The document EP-1 376 808 illustrates one such mounting.

It is equally known to produce a mounting in which the suspension rods are disposed on the longitudinal axis of the cable raceway. A support is then fixed to a threaded rod and the cable raceway, through which said threaded rod passes, comes to rest on the support.

These diverse types of mounting necessitate the use of nuts for the mounting of the supports and require a certain mounting time.

It is equally known from the document WO-2007/075054 to use a hook mounted on a threaded rod for finishing a ceiling. This document discloses a suspension device including a hook/threaded rod connection unit with holes through it at the top and the bottom and a profiled connection unit that extends under the hook/threaded rod connection unit and enables the reversible mounting of a section.

The document JP-02/113080U shows a U-shaped body held on a threaded rod with the aid of elastic means and carrying a hook.

An object of the present invention is to enable easy and fast mounting of a wire cable raceway on a threaded rod. A device of the invention will preferably allow continuous adjustment of the position of the cable raceway on the threaded rod.

SUMMARY OF THE INVENTION

To this end, the present invention proposes a device for fixing a wire cable raceway onto a threaded rod, including:
- a body with support means featuring a first support surface and a second support surface opposite the first support surface,
- means for fixing onto a threaded rod including two elastic arms each provided with a notch, called the first notch, the bottom of which is intended to cooperate with the thread of the threaded rod in order to lock the fixing device onto the threaded rod.

The two opposite support surfaces are each adapted to serve as a support for a warp wire of a wire cable raceway. Thanks to its elastic arms, the device therefore enables fast fixing to a threaded rod whereas the support surfaces adapted to a cable raceway receive a cable raceway. By adapting the support surfaces to the geometry of a cable raceway, a fixing device can then make a direct connection between said cable raceway and a threaded rod.

In an embodiment that is advantageous for the distribution of the forces on the threaded rod and in the interior of the fixing device, the two arms preferably each extend from the body in opposite directions. In this embodiment, the body can have a substantially plane back, for example, each arm can feature a substantially plane part inclined relative to the back, and the free end of each arm can feature a substantially plane part extending in a plane substantially perpendicular to the back, this latter part carrying a first notch. As an alternative to this, each arm can further feature a substantially plane part substantially parallel to the back between the inclined part and the part perpendicular to the back. In this embodiment and its variants, the first notches are preferably oriented toward the back of the body for improved retention on a threaded rod.

To obtain a fixing device that is easy to manufacture and therefore of low cost, this device is advantageously produced from sheet metal cut and bent to shape.

Where the support means are concerned, the fixing device of a first embodiment of the invention can then be such that the body includes a substantially plane back, two parallel rims extending perpendicularly to the substantially plane back to form the two support surfaces. For example, each of the two rims features at one end a notch, called the second notch, intended to receive a warp wire of a section of cable raceway, and the opposite end of each rim features a boss for producing a hard spot to produce a snap fastening.

In a second embodiment of the support means of a device of the present invention, the body includes:
- a substantially plane back,
- at least one rim extending perpendicularly to the back and featuring at one end a second notch intended to receive a warp wire in such a manner as to form the first support surface, and
- at least one lug extending from the back in such a manner as to form the second support surface.

In an advantageous variant embodiment, the lug is obtained by cutting into the back of the body. This lug can also be provided with a boss to enable snap fastening of the fixing device to a section of cable raceway.

In a third embodiment, the body of the fixing device of the present invention includes a substantially plane back in which are cut out at least two tongues that are bent to form support surfaces by forming a V-shape with the back.

In embodiments in which the body includes a substantially plane back, the first notches are oriented toward the back of the body, for example.

A fixing device of the present invention can further include a supporting tongue disposed substantially in alignment with the first two notches and bent so that its free end comes to cooperate with the thread of the threaded rod to produce a third support, opposite the supports produced on the threaded rod at the level of the first notches.

The present invention also concerns an assembly formed by a fixing device and a section of wire cable raceway including longitudinal warp wires and transverse weft wires connecting the warp wires, the wire cable raceway featuring a bottom intended to receive electrical cables or the like and two lateral flanges each featuring at least two warp wires, which fixing device is a fixing device as described above and is mounted between two adjacent warp wires of a lateral flange of the cable raceway.

BRIEF DESCRIPTION OF THE DRAWINGS

Details and advantages of the present invention will emerge more clearly from the following description, given with reference to the appended diagrammatic drawings in which:

FIGS. 7 to 10 are views similar to the views of FIGS. 1 to 4, respectively, showing a preferred embodiment of a device of the invention.

DETAILED DESCRIPTION OF PREFERRED EMBODIMENTS

Figure 1:
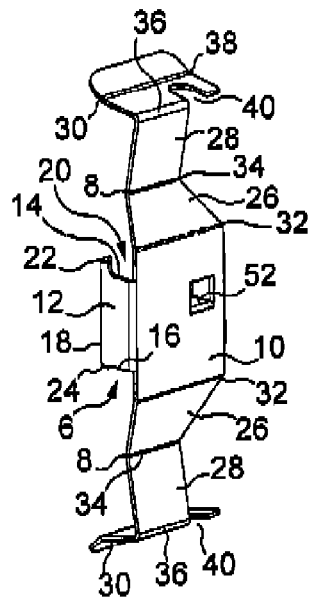
FIG. 1 is a perspective view of a fixing device of the present invention.
Figure 2:
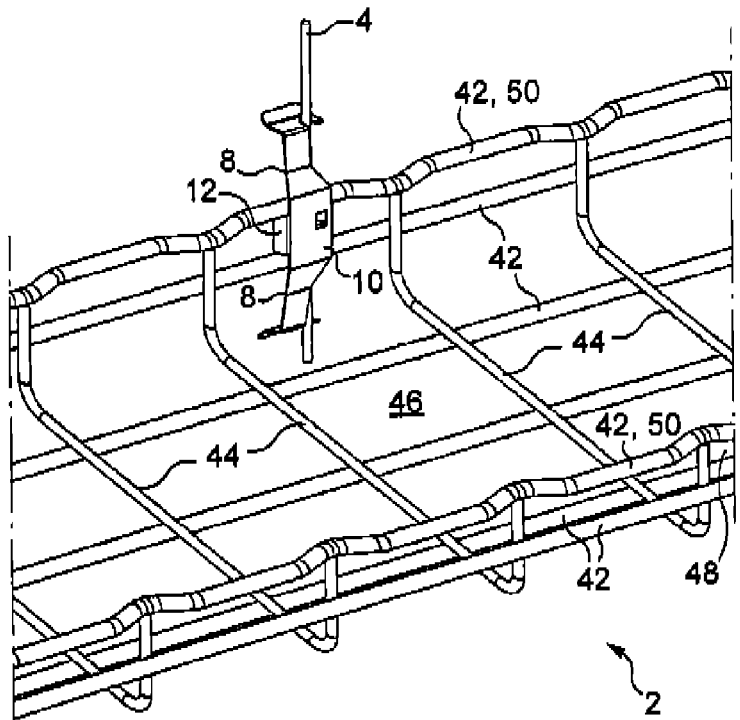
FIG. 2 represents the mounting of a section of cable raceway with the aid of the device from FIG. 1.

FIGS. 1 to 4 show a first embodiment of a device for fixing a wire cable raceway onto a threaded rod. As shown in FIG. 2, this device is intended for fixing a section of cable raceway 2 onto a threaded rod 4.

The fixing device of the invention is preferably produced from sheet metal cut and bent to shape. This is the case for the four embodiments represented in the figures, but other embodiments could be envisaged.

The fixing device represented in FIGS. 1 to 4 includes on the one hand a central body 6 and on the other hand elastic arms 8 each extending from the central body 6. The central body 6 is intended in particular to support the section of cable raceway 2 whereas the elastic arms 8 are used for the fixing of the device to the threaded rod 4.

The central body 6 features a plane part hereinafter called the back 10. This plane part is of rectangular shape. Two opposed edges of the back 10 each carry an elastic arm 8.

It will be assumed in the remainder of the description that the back 10 is disposed in a substantially vertical plane and that the elastic arms 8 extend from the back 10, one upward and the other downward. There are then an upper elastic arm 8 and a lower elastic arm 8.

The edges of the back 10 that do not carry the elastic arms 8 are called lateral edges. Each lateral edge carries a support arm 12 formed by a rim extending perpendicularly relative to the back 10. The two support arms 12 are disposed symmetrically relative to the back 10 and are identical to each other.

Each support arm 12, given the orientation previously adopted, features an upper edge 14, a lower edge 16 and a free edge 18 opposite the lateral edge of the back 10 to which it is attached.

The upper edge 14 of each support arm 12 features a notch 20 extending over the greater part of the upper edge 14. In the embodiment represented, in particular to facilitate bending the support arm 12, the notch 20 extends from the back 10 and thus defines a finger 22 on the same side as the free edge 18.

The lower edge 16 of each support arm 12 is substantially rectilinear and features a boss 24 at its free end (adjoining the free edge 18).

The two elastic arms 8 are symmetrical relative to the back 10. Only the upper elastic arm 8 is described hereinafter. The upper elastic arm 8 represented in the drawings consists of three parts: an inclined part 26, a substantially vertical part hereinafter called the vertical part 28 and a substantially horizontal part called hereinafter the horizontal part 30.

The inclined part 26 (of the upper elastic arm 8) extends from the upper edge of the back 10 and is inclined toward the face of the back 10 on the same side as the support arms 12. In the first embodiment represented in the drawings, this inclined part 26 features a trapezoidal shape so that the elastic arm 8 becomes thinner in the direction away from the back 10 and forms a first bend 32 with the back 10.

The vertical part 28 extends the inclined part 26 and is separated from the latter by a second bend 34. It carries at its end opposite the inclined part the horizontal part 30 that is bent at approximately a right angle to the vertical part 28 so as to diverge from the back 10, thus forming a third bend 36.

The horizontal part 30 features a greater width than the vertical part 28. One lateral edge of the horizontal part is in line with the corresponding lateral edge of the vertical part whereas the opposite horizontal part has an overhang 38 relative to the vertical part 28. A notch 40 is produced in the overhang 38 and opens alongside the third bend 36. This notch 40 is intended to receive the threaded rod 4.

Note in FIGS. 1 to 4 that the free edge of the horizontal part 30 is slightly raised so that the horizontal part 30 features something of the shape of a dihedron. This shape is given here to enable a better grip on the elastic arm 8 by its horizontal part 30 for mounting the fixing device, as explained hereinafter.

FIG. 2 illustrates the use of the fixing device shown in FIG. 1 and described above for fixing the section of cable raceway 2 onto the threaded rod 4.

In the standard way and as represented in FIG. 2, the section of cable raceway is trough-shaped and includes longitudinal wires called warp wires 42 and transverse wires called weft wires 44. The warp wires 42 are rectilinear wires (except for the edge wires in the embodiment represented, which are nevertheless substantially rectilinear). As for the weft wires 44, they are U-shaped. The section of cable raceway 2 therefore features a bottom panel 46 and two lateral panels 48. It is assumed here that the bottom panel 46 is in a lower position relative to the lateral panels 48. This bottom panel 46 is disposed in a substantially horizontal plane whereas the lateral panels 48 extend substantially vertically. Such an orientation is usual for a section of cable raceway and corresponds to the orientation chosen above for the fixing device. However, other orientations can be envisaged, for example with the bottom panel 46 disposed vertically or inclined.

FIG. 2 also shows the threaded rod 4. The latter is for example screwed into a ceiling (not represented) using a plug (not represented). It is assumed that the ceiling is horizontal. The threaded rod 4 then extends perpendicularly, that is to say vertically, from the ceiling, below the latter.

For fixing the section of cable raceway 2, the fixing device is first positioned on this section. As illustrated in FIG. 2, there is provision for mounting the fixing device on a lateral panel 48 of the section of cable raceway 2, between two adjacent warp wires 42. In the embodiment represented, the lateral panel 48 including only two warp wires 42, the fixing device is mounted between these two warp wires 42, one of them being an edge wire 50.

For mounting the fixing device onto the section of cable raceway 2, the fixing device is disposed in the interior of the section and the edge wire 50 is placed in the notches 20 of the support arms 12. By pivoting the fixing device around the edge wire 50, the lower edge 16 of each support arm 12 comes to rest on the adjacent warp wire. Thanks to the boss 24, this placement movement passes over a hard spot that has to be overcome to snap fasten the fixing device in its position mounted on the section of cable raceway 2.

In this way, the fixing device features a first support surface defined by the bottoms of the notches 20 and a second support surface defined by the lower edges 16. Of course, the distance separating the bottom of the notches 20 from the corresponding lower edges 16 is adapted to suit the distance separating two adjacent warp wires of a lateral panel 48 of the section of cable raceway 2. The fixing device therefore bears on the one hand on the lower face of the edge wire 50, or more generally on the lower face of an upper lateral warp wire, and on the other hand on the upper face of an adjacent warp wire 42, or lower lateral warp wire.

Once the fixing device has been mounted on the section of cable raceway 2, this assembly can be mounted on the threaded rod 4. The latter is then introduced into a notch 40 in the horizontal part 30 of an elastic arm 8. The threaded rod 4 must then be inserted in the other notch 40 in the other elastic arm 8. This is achieved by pulling on the corresponding horizontal part 30 to deform the elastic arm 8 in order to insert the threaded rod 4 into the other notch 40. The depth of the notches 40 and the geometry of the fixing device (the inclination of the inclined part, the length of the elastic arms, etc.) are such that when the threaded rod 4 is inserted into the two notches 40, each elastic arm 8 is deformed elastically so that the bottom of each notch 40 comes to bear on the threaded rod 4. As a result, the bottom of each notch 40 comes to lodge in and bear on the bottom of the thread of the threaded rod 4, retaining the fixing device and the section of cable raceway 2 on which it is mounted on the threaded rod 4.

Figure 3:
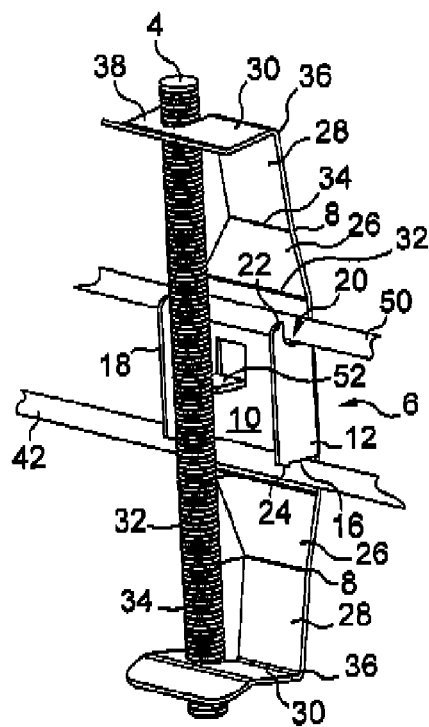
FIG. 3 shows the device from FIG. 1 to a larger scale and from a different angle when it is used for fixing a section of cable raceway.
Figure 4:
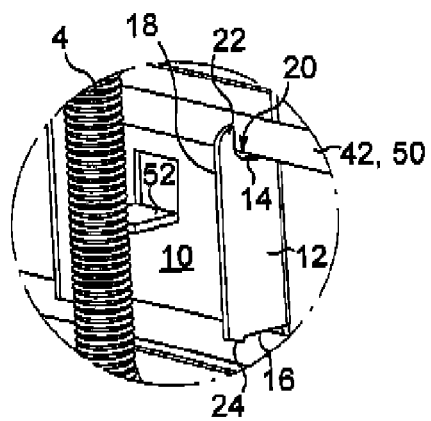
FIG. 4 is a detail view of FIG. 3, to a larger scale, illustrating the locking of the device from FIGS. 2 and 3 onto a threaded rod.

FIGS. 3 and 4 illustrate an additional bearing point of the fixing device on the threaded rod 4. The bottoms of the notches 40 both act on the same side of the threaded rod 4. It is proposed to provide a counter-bearing point of the fixing device on the threaded rod 4. In the embodiment of FIGS. 1 to 4, it is proposed to provide in the back 10 a bent tongue 52 substantially in alignment with the notches 40. The mounting of the section of cable raceway 2 on the threaded rod 4 can then be carried out in the following manner. The section of cable raceway 2 is first positioned on the threaded rod 4 with the free end of the tongue 52 coming to bear against the thread of the threaded rod 4. The elastic arms 8 are then deformed elastically one after the other to cause the threaded rod 4 to penetrate into the notches 40. As a result, there are produced two bearing points—via the notches 40—on one side of the threaded rod 4 and one bearing point—via the tongue 52—on the opposite side. Perfect retention of the fixing device on the threaded rod 4 can thus be effected.

Figure 5:
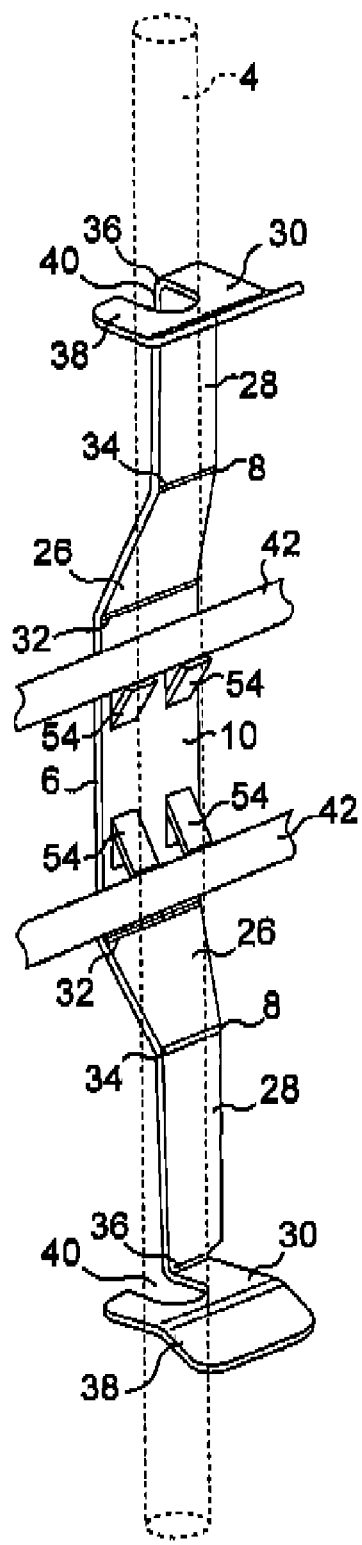
FIG. 5 shows in perspective a variant embodiment of the device from FIG. 1.
Figure 6:
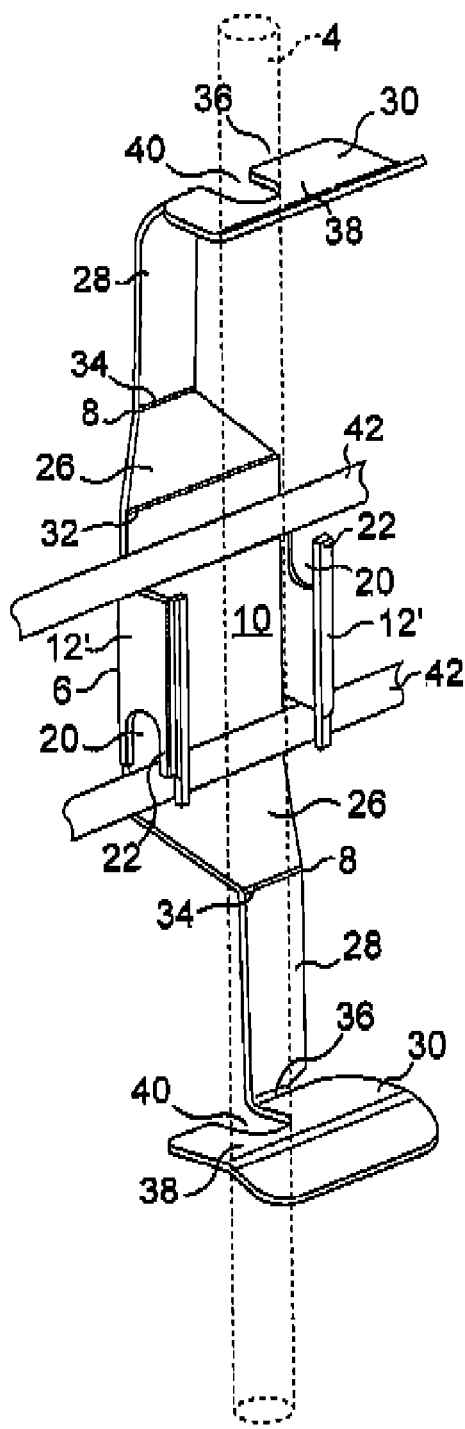
FIG. 6 illustrates another variant embodiment of a device of the invention.

FIG. 5 shows a variant embodiment of a fixing device of the present invention. In this embodiment, the bearing points on the warp wires of the section of cable raceway 2 are modified relative to the embodiment of FIGS. 1 to 4. The references used for the first embodiment are used again for this second embodiment—and for the other embodiments of FIGS. 6 to 10—to designate elements common to these diverse embodiments.

In FIG. 5, compared to the first embodiment described above, the support arms are no longer present. However, bearing surfaces are present to produce a bearing on the one hand on a lower face of an upper warp wire and on the other hand on an upper face of a lower warp wire.

To produce said bearing surfaces, said tongues 54 are cut into the back 10 and bent at approximately 45°. In the embodiment represented, there are four tongues 54. Two tongues 54 are bent in such a manner as to form with the back 10 a V-shape open at the top whereas the other two tongues 54 are bent in such a manner as to form with the back 10 a V-shape open at the bottom. Each V-shape formed in this way is intended to receive a warp wire 42 between its branches.

The mounting of this fixing device is substantially similar to the mounting described above with reference to the first embodiment. Here no snap fastening with the aid of bosses is effected but a snap fastening by passing over a hard spot is produced here in an analogous manner.

The embodiment of FIG. 6 again uses support arms 12' for the connection between the fixing device and the section of cable raceway 2. However, the support arms 12' are not mounted symmetrically, but one support arm 12' is mounted the other way around relative to the other support arm 12'. There is then a notch 20 in one support arm 12' opening into the upper edge of the corresponding support arm 12' whereas the notch 20 in the other support arm 12' opens into the lower edge of that other support arm 12'.

Here the mounting of this fixing device differs slightly from the mounting described with reference to FIGS. 1 to 4. The fixing device must be offered up slantwise relative to the section of cable raceway so as to introduce one warp wire into one notch 20 and the other warp wire into the other notch 20. The fixing device is then pivoted about an axis substantially perpendicular to the back 10 to take up the position shown in FIG. 6.

The preferred embodiment of a fixing device of the present invention represented in FIGS. 7 to 10 is close in appearance to the first embodiment shown in FIGS. 1 to 4. Compared to the first embodiment, this fourth embodiment proposes a different second surface. Whereas in the first embodiment (FIGS. 1 to 4), the second support surface is formed by the lower edges 16 of the support arms 12, in this fourth embodiment (FIGS. 7 to 10), a lug 56 is used to form this second support surface.

Compared to the first embodiment, the fourth embodiment (FIGS. 7 to 10) differs on the one hand by the fact that the support arms 12 feature a smaller height so that their lower edge 16' no longer comes into contact with a warp wire 42 in the mounted position illustrated in FIGS. 8 to 10 and on the other hand by the presence of at least one lug 56. The latter is obtained—like the tongue 52—by cutting into the back 10 of the body 6 of the device and is bent on the one hand to come into a substantially horizontal position and on the other hand to be conformed in such a manner as to feature a concave face as described previously and the boss 24'.

Retaining the above orientation for the first embodiment, the lug 56 is disposed substantially horizontally. It is concave on its lower face in such a manner as to be able to come into better contact with a lower warp wire 42. As represented in the drawings, in FIGS. 9 and 10, note that the lug 56 features a boss 24'. This enables mounting with snap fastening to be obtained, as for the first embodiment.

The mounting of this fourth fixing device is similar to the mounting of the first fixing device from FIGS. 1 to 4. The fixing device is disposed in the interior of the section of cable raceway 2 and a warp wire 42, possibly an edge wire 50, is placed in the notches 20 of the support arms 12. The fixing device is pivoted about the warp wire (42 or 50), called the upper warp wire, so that the lug 56 comes to be snap fastened onto the adjacent warp wire, or lower warp wire. The boss 24' produces a snap fastening.

Compared to the first embodiment, thanks in particular to the elasticity of the lug 56, this fourth embodiment on the one hand produces a good support with greater tolerances on the distance separating two warp wires of one lateral edge and on the other hand facilitates removal of the section of cable raceway 2 from the fixing device, by acting on the lug 56.

The assembly formed by the section of cable raceway 2 and the fixing device from FIGS. 7 to 10 is mounted on the threaded rod 4 in the same manner as the fixing device from FIGS. 1 to 4.

The diverse embodiments described hereinabove and represented in the drawings enable quick and easy connection of a section of cable raceway to a threaded rod without using any tools or screw fastenings. Furthermore, continuous adjustment of the position of the section of cable raceway relative to the threaded rod is possible.

The diverse embodiments of the fixing device of the invention solve the problem of the fastidious mounting of a cable raceway on a threaded rod. Furthermore, in the embodiments represented in the drawings and described hereinabove, the fixing device can be premounted on the cable raceway, thus being able to remain in place without risk of falling off for the time taken to connect the cable raceway to the threaded rod.

The embodiments described hereinabove, in the mounted position, are also not aggressive to the cables and the like disposed in the cable raceway. In the embodiments represented, the back of the fixing device is pressed against the lateral wall of the cable raceway inside the latter but without forming an aggressive projection in the cable raceway.

These embodiments are particularly adapted to fixing a wire cable raceway. The fixing device is designed to carry a section of cable raceway directly and no intermediate part is necessary.

Fixing devices of the invention can also produce a mounting of the swing tray type. If there is a threaded rod on each side of a cable raceway, the cable raceway can be connected to each threaded rod directly by a fixing device as described hereinabove. Relatively heavy loads can then be placed in the cable raceway.

The present invention is not limited to the embodiments described hereinabove by way of nonlimiting example. It also concerns all other variant embodiments that will be evident to the person skilled in the art within the scope of the following claims.

For example, the two elastic arms are not forcibly on opposite sides of the body carrying the support means of the section of cable raceway. There could be on the same side of this body two elastic arms forming a V-shape between them, each arm featuring a notch. Through the elasticity of the arms, fixing onto a threaded rod is achieved in the same manner.

There is claimed:

1. A fixing device, comprising:
   a body with a means for support featuring a first support surface and a second support surface opposite the first support surface, the body featuring a substantially plane back; and
   means for fixing onto a threaded rod including two elastic arms each provided with a first notch, said first notch is intended to cooperate with a thread of the threaded rod in order to lock the fixing device onto the threaded rod, and the two arms extend from the body in opposite directions, each arm features a first substantially plane part inclined relative to the substantially plane back, and a free end of each arm features a second substantially plane part extending in a plane substantially perpendicular to the substantially plane back, the second substantially plane part carrying the first notch,
   wherein the fixing device is configured for fixing a wire cable raceway onto the threaded rod.

2. The fixing device as claimed in claim 1, wherein each arm features a third substantially plane part substantially parallel to the substantially plane back between the inclined part and the part perpendicular to the substantially plane back.

3. The device as claimed in claim 1, wherein the first notches are oriented toward the substantially plane back of the body.

4. The fixing device as claimed in claim 1, wherein the two arms are symmetrical relative to the body.

5. The device as claimed in claim 2, wherein the first notches are oriented toward the substantially plane back of the body.

6. The fixing device as claimed in claim 1, produced from sheet metal cut and bent to shape.

7. The fixing device as claimed in claim 6, wherein the body includes the substantially plane back, two parallel rims extending perpendicularly to the substantially plane back in such a manner as to form the first and second support surfaces.

8. The fixing device as claimed in claim 6, wherein the body includes:
   the substantially plane back,
   at least one rim extending perpendicularly to the substantially plane back and featuring at one end a second notch intended to receive a warp wire in such a manner as to form the first support surface, and
   at least one lug extending from the substantially plane back in such a manner as to form the second support surface.

9. The fixing device as claimed in claim 6, wherein the body includes the substantially plane back into which are cut at least two tongues which are bent in such a manner as to form additional support surfaces forming an angled V-shape with the back.

10. The device as claimed in claim 1, further including a bendable bearing tongue disposed substantially in alignment with the first notches of the two elastic arms and bent so that a free end of the bendable bearing tongue comes to cooperate with the thread of the threaded rod to produce a third bearing point, opposite first and second bearing points produced on the threaded rod at a level of the first notches.

11. A fixing device, comprising:
a body with a means for support featuring a first support surface and a second support surface opposite the first support surface; and
means for fixing onto a threaded rod including two elastic arms each provided with a first notch, said first notch is intended to cooperate with a thread of the threaded rod in order to lock the fixing device onto the threaded rod,
wherein the fixing device is configured for fixing a wire cable raceway onto the threaded rod,
the fixing device being produced from metal and being cut and bent into shape,
the body includes a substantially plane back, two parallel rims extending perpendicularly to the substantially plane back in such a manner as to form the first and second support surfaces, and
each of the two rims features at one end a second notch, intended to receive a warp wire of a section of cable raceway, and an opposite end of each rim features a boss for producing a hard spot for producing a snap fastening.

12. An assembly, comprising:
a fixing device; and
a section of wire cable raceway including longitudinal warp wires and transverse weft wires connecting the warp wires, the wire cable raceway featuring a bottom intended to receive electrical cables and two lateral flanges each featuring at least two warp wires, wherein the fixing device is a fixing device as claimed in claim 1, and said fixing device is mounted between two adjacent warp wires of a lateral flange of the cable raceway.

13. A fixing device, comprising:
a body with a support formed from a first support surface and a second support surface opposite the first support surface, the body featuring a substantially plane back; and
a member configured to fix onto a threaded rod including two elastic arms each provided with a first notch, said first notch is intended to cooperate with a thread of the threaded rod in order to lock the fixing device onto the threaded rod, the two arms each extending from the body in opposite directions, each arm features a first substantially plane part inclined relative to the substantially plane back, and a free end of each arm features a second substantially plane part extending in a plane substantially perpendicular to the substantially plane back, the second substantially plane part carrying the first notch,
wherein the fixing device is configured for fixing a wire cable raceway onto the threaded rod.

* * * * *